Figure 2:
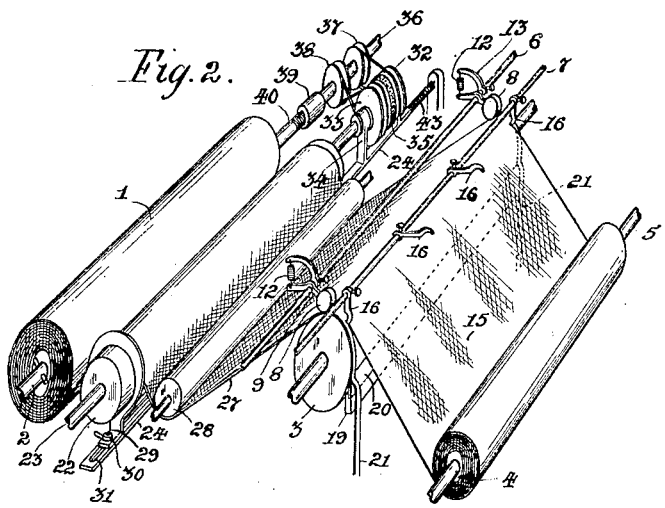

F. W. DENISON.
MACHINE FOR TRIMMING AND CUTTING LENGTHS OF CLOTH OR OTHER MATERIAL.
APPLICATION FILED JUNE 8, 1908.
909,853.
Patented Jan. 12, 1909.
2 SHEETS—SHEET 1.
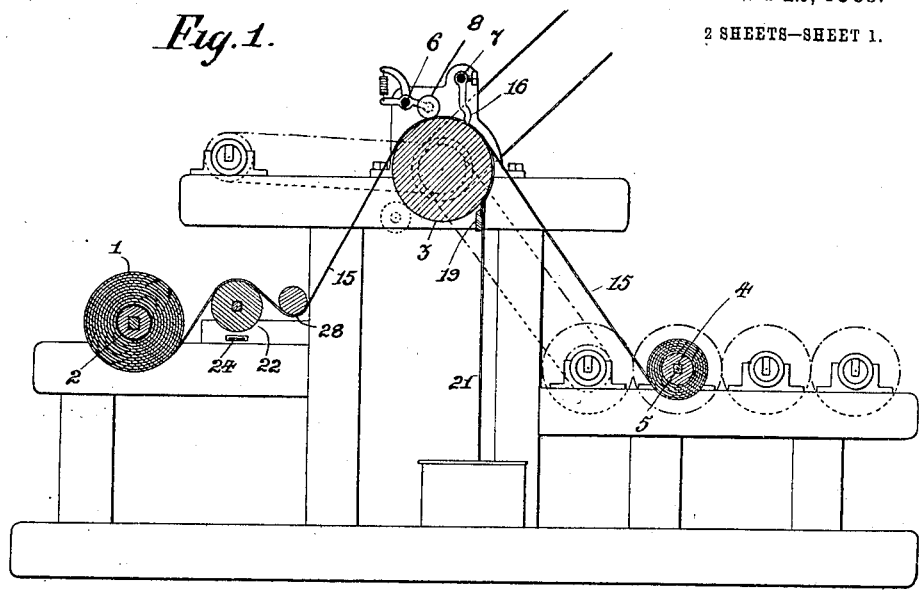
Fig. 1.
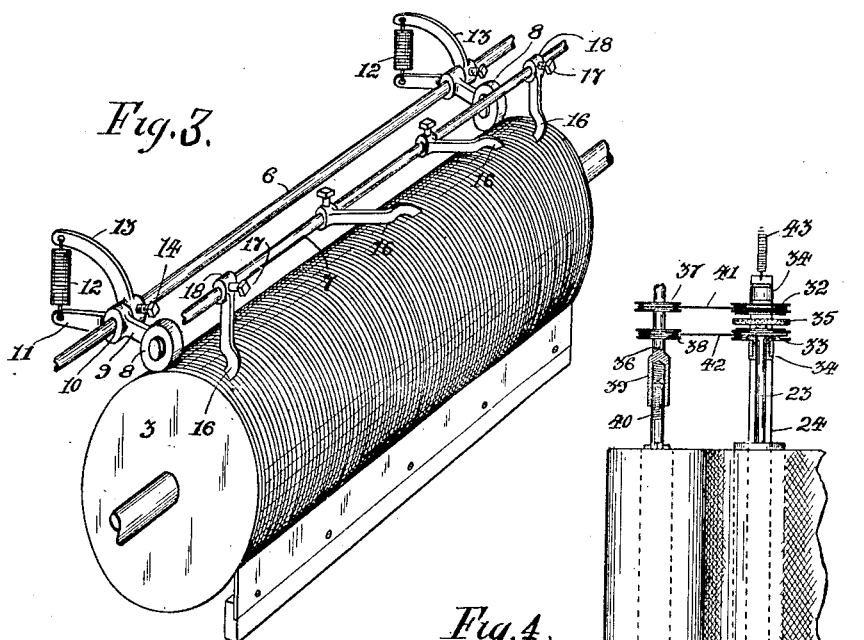
Fig. 3.
Fig. 4.
Witnesses.
Inventor.

F. W. DENISON.
MACHINE FOR TRIMMING AND CUTTING LENGTHS OF CLOTH OR OTHER MATERIAL.
APPLICATION FILED JUNE 8, 1908.

909,853.

Patented Jan. 12, 1909.

2 SHEETS—SHEET 2.

UNITED STATES PATENT OFFICE.

FRANK WINDSOR DENISON, OF MONTREAL, QUEBEC, CANADA, ASSIGNOR OF ONE-FOURTH TO GEORGE WILLIAM COOK AND ONE-FOURTH TO IVAN STUART WOTHERSPOON, OF MONTREAL, CANADA.

MACHINE FOR TRIMMING AND CUTTING LENGTHS OF CLOTH OR OTHER MATERIAL.

No. 909,853.     Specification of Letters Patent.     Patented Jan. 12, 1909.

Application filed June 8, 1908. Serial No. 437,460.

*To all whom it may concern:*

Be it known that I, FRANK WINDSOR DENISON, a citizen of the United States of America, and resident of 55 Papineau avenue, in the city and district of Montreal, in the Province of Quebec, in the Dominion of Canada, have invented certain new and useful Improvements in Machines for Trimming and Cutting Lengths of Cloth or other Material, of which the following is a specification.

The invention relates to improvements in a machine for trimming and cutting lengths of cloth or other material, as described in the present specification and illustrated in the accompanying drawings that form part of the same.

The invention consists essentially in the novel construction and arrangement of parts whereby the material is guided and cut in passing over a roller and held closely thereto during the operation of the knife.

The objects of the invention are to save material and labor in trimming material for use in making belting, to cut strips from any material with quickness and despatch, and generally to provide a simple and durable machine for cutting rubber duck and other material.

In the drawings, Figure 1 is a vertical section of the machine showing the arrangement of the rollers. Fig. 2 is a perspective view showing the arrangement of rollers and the length of material passing thereover to be trimmed at the side edge, apart from the frame. Fig. 3 is an enlarged perspective detail of the driven roller over which the material passes in being trimmed. Fig. 4 is a part sectional plan view from above of an automatic adjusting device for regulating the lateral position of the length of material passing over the rollers.

Like numerals of reference indicate corresponding parts in each figure.

Referring to the drawings, 1 is a bale of fabric, 2 is the shaft loosely journaled in suitable bearings at one end of the frame of the machine and carrying said bale of fabric 1. 3 is a main feed roll grooved circumferentially and journaled in suitable bearings centrally in the frame of said machine and driven in any suitable manner.

4 is a roll mounted on the shaft 5, said shaft 5 being journaled in the frame of the machine on the other side of the main feed roll 3 from the shaft 2, so that the said roll 4 is the receiving roll for the fabric which passes from the shaft 2 over the main feed roll 3 on to the roll 4, the shaft of the said roll 4 being removable from its bearings in the frame of the machine. The main feed roll 3 is preferably at an elevation in relation to the journaling of the shafts 2 and 5, the frame being arranged accordingly.

6 and 7 are rods rigidly secured in the upwardly projecting portions of the frame of the machine at each end of the main feed roll 3, the rod 6 being slightly in advance of said roll in relation to the travel of the fabric thereover and the roll 7 being slightly beyond the center of said roll in relation to said travel.

8 are pressure rollers journaled at the inner ends of the arms 9, said arms 9 having the journals 10 mounted on the rod 6 and the rearward extensions 11 joined to the brackets 13 by the helical springs 12, said brackets 13 being adjustable to different rigid positions by the set screws 14 engaging the rod 6 from which said brackets 13 project. The rollers 8 will thus be retained in continuous pressure against the main feed roll 3, consequently the fabric in passing over said roll will be held closely to the roll in advance of any cutting operation.

Any form of pressure device may be used and any number arranged upon the rod, but for the purpose of edge trimming as illustrated in Fig. 2, two pressure rollers only are necessary, one being applied adjacent to one edge of the fabric and the other as applied adjacent to the other edge.

16 are knives adjustably secured on the rod 7 and held rigidly to a cutting or free position by the set screws 17 inserted through the ring ends 18 of said knives and engaging said rod 7. It will be seen that the knives 16 may be moved to any suitable position on said rod so that any width of strip may be cut from said fabric, again one or more knives may be used at a time, as the said screws will keep the said knives free from the fabric or in engagement therewith.

19 is a stripping knife having the blade 20 and supported from the frame of the machine to each end of the main feed roll 3 and extending upwardly into the immediate proximity of said roll at the under side thereof so that the edge of said blade 20 will strip from said main feed roll all the lengths 21 cut from the fabric and not guided to the receiving roll 4, otherwise the said strips will cling to the main feed roll, unless they are guided therefrom manually.

22 is a roll journaled in the frame of the machine in advance of the main feed roll 3 and between said main feed roll and the shaft 2 carrying the bale of fabric, so that the main length of fabric, in order to reach over the main feed roll 3 passes over the roll 22, a small tension roll 28 being journaled in the frame of the machine between said roll 22 and said feed roll. The said roll 22 is rigidly mounted on the shaft 23, said shaft being journaled as aforesaid in the frame of the machine and laterally movable in its bearings in relation to the frame of the machine.

24 is a bar extending across the machine under the roll 22 and having the slot 31 therethrough adjacent to one end thereof.

25 is a strap guide in the form of a ring and encircling the roll 22 adjacent to one end thereof and having the angle extension 29 at the lower end thereof secured to the bar 24 by the bolt and nut 30, so that said guide is adjustable to the full extent of the length of the slot 31.

34 are bearings projecting upwardly from the bar 24 at the other end thereof.

32 and 33 are pulleys suitably mounted and journaled in the bearings 34, said shaft 24 extending through said pulleys and bearings 34 and rotating independently thereof.

35 is a disk fixedly mounted on the shaft 23 between the pulleys 32 and 33 and adapted to engage one or other of said pulleys on any lateral movement of the bar 24 or the said shaft 23 in its bearings, consequently when the shaft 23 rotates and engages one or other of said pulleys 32 or 33, the particular pulley engaged will be rotated by said shaft.

36 is a shaft journaled in the frame of the machine independently of the shaft 2 and in alinement therewith, said shaft 36 having a threaded sleeve fixedly secured thereto at one end thereof engaging the corresponding end of the shaft 2.

37 and 38 are pulleys fixedly mounted on the shaft 36 in belt alinement with the pulleys 32 and 33.

39 is a screw box engaging a threaded part 40 of the shaft 2.

41 and 42 are belts joining the pulleys 32 and 37 and 33 and 38 respectively, the belt 42 being crossed so as to rotate the pulley 38 in the opposite direction in respect to the pulley 37, while the pulleys 32 and 33 always rotate in the same direction.

It will be thus seen that if the fabric passing over the main feed roll gets out of proper alinement, it will move the bar 24 coming into engagement with the guide 25 in order to move said roll, as that particular edge of the fabric is continuously abutting said guide, the lateral movement of the bar 24 will, as explained, in the foregoing, bring the friction disk 35 in contact with the pulley and rotate that pulley, this will rotate the one or other of the pulleys 37 or 38 and adjust the lateral position of the shaft 2 in relation to the machine and consequently bring the bale in proper alinement in the course of the fabric through said machine. The bar 24 is attached at one end to the frame by the spring 43 so as to keep the guide 25 in constant engagement with the edge of the cloth no matter where that edge may be at that particular end of the roll.

In the operation of this machine, the bale of fabric is mounted on the shaft 2, and the end drawn out over the roller 22, under the roller 28 and over the main feed roll 3 and then the knife 16 may be fixed in position to engage the length of fabric adjacent to the edge thereof to cut the strip 21, and an end knife at the other end when it is desirable to cut a strip from each side, may be fixed in a similar position, the points of both knives reaching into a circumferential groove in the said main roll 3. The main portion of the cloth at the end thereof is turned around on the roll 4, the roll 4 rotates and in rotation draws the cloth from the bale 1, the pressure rollers 8 holding said cloth firmly on said main roll. In sticky material, such as rubber duck, there is no trouble whatsoever about the drawing of the length of fabric from the bale 1 over the roll 3 and for other material, suitable arrangements can be made to have practically the same operation.

It has not been mentioned in the specification that the shaft 5 is operatively connected with the driven power, for the main feed roll, though it will be understood that some such arrangement is obvious in order that the said roll 4 may receive the cloth in passing over said main feed roll. As the fabric passes over said main feed roll it will be seen that the knives engaging said fabric cut an edge length or lengths from the fabric, this is the rough edge and the length of cloth does not continue with said main length on to the roll 4, as the new bale on the roll 4 is trimmed. The said edge length or lengths are stripped from the main feed roll 3 by the blade 20 and as the said blade 20 and its holder 19 are in the form of a beveled guide, the said edge lengths are completely cleared away from the said main roll and dropped to the ground or into suitable receptacles. The latter position of the length of cloth in relation to the machine frame has already been referred to, however, in fuller explanation, it may be said that the guide 25 keeps a continuous pressure on that edge of the cloth, as it is spring-held thereagainst. The movement of said cloth laterally to the roll in relation to the frame of the machine or longitudinally in relation to the length of the roll, brings one or other of the pulleys 32 or 33 in contact with the friction disk 35 which immediately sets into motion one or other of the pulleys 37 or 38 rotating the sleeve 39 and drawing or pushing the shaft 2 carrying the bale of goods 1, with the result that the position of the length is adjusted automatically to insure perfect line in trimming the edges.

What I claim as my invention is:

1. In a machine for trimming or cutting lengths of cloth or other material, a main roll, a rod independently supported above said roll, a knife adjustably arranged on said rod and extending into the material passing over said roll, a rod independently supported in advance of said knife carrying rod and pressure rollers secured thereon and engaging said material in advance of the cutting operation.

2. In a machine for trimming or cutting lengths of cloth or other material, a main roll having a plurality of circumferential grooves therein arranged, a rod independently supported above said roller, a plurality of knives adjustably secured on said rod and arranged to extend downwardly into the material passing over said roll, a rod independently supported on said main roll and pressure rollers extending from the latter roll engaging said material in advance of the cutting operation.

3. In a machine for trimming or cutting lengths of cloth or other material, a main roll, a plurality of knives suitably supported above said roll and arranged to extend into the material passing over said roll, and a beveled guide arranged longitudinally in relation to said roll adjacent thereto and to the rear thereof and adapted to engage the loosely flowing strips trimmed from the material in passing over the said roll.

4. In a machine for trimming or cutting lengths of cloth or other material, a main roll, an auxiliary in advance of said main roll, a guide plate encircling said auxiliary roll and engaging the edge of the material passing over said auxiliary roll to said main roll and spring-held longitudinally in relation to said auxiliary roll, and means connected with said auxiliary roll for transmitting lateral motion of the bale of material following the lateral motion of said auxiliary roll.

5. In a machine for trimming or cutting lengths of cloth or other material, a main roll, an auxiliary roll in advance thereof, a guide plate surrounding said auxiliary roll and spring-held to engagement with the edge of the material passing over said roll to said main roll, a shaft extending from said auxiliary roll, a disk fixedly mounted on said shaft, bearings supported to each side of said disk and encircling said shaft and independent thereof, pulleys journaled on said bearings, a shaft carrying a bale of material having a threaded outer end and suitably journaled, a shaft journaled in alinement therewith, a nut fixedly mounted on the latter shaft and turning on said threaded end of the bale shaft, pulleys mounted on said nut shaft, and belts suitably connecting the aforesaid pulleys with the latter pulleys.

6. In a device of the class described, in combination, a frame having a plurality of bearings arranged therein, a main roll having circumferential grooves arranged therein and journaled in said frame, a shaft journaled in said frame in advance of said main roller and carrying a bale of material thereon, an auxiliary roll journaled in said frame adjacent to said bale shaft, a tension roll journaled in said frame and engaging the length of material fed from said bale over said main roll between said auxiliary roll and the said main roll, a knife suitably supported above said main roll and extending into one of said grooves through said material, and a shaft journaled to the rear of said main roll and receiving the length of cut material in bale form.

7. In a device of the class described, in combination, a frame having a plurality of bearings therein arranged, a main roll journaled in said frame, a shaft journaled in said frame carrying the bale of material and laterally adjustable, an auxiliary roll between said bale of material and said main roll, means connected with said auxiliary roll for adjusting the lateral position of said bale shaft, a tension roll journaled between said auxiliary roll and said main roll, a knife adjustably supported above said main roll and arranged to extend through said material passing over said roll, and a beveled guide to the rear of said main roll and supported in said frame and clearing the trimmed strips from said main roll, and a shaft journaled to the rear of said main roll and receiving the material in bale form.

8. In a device of the class described, in combination, a shaft journaled in said frame and carrying a bale and laterally adjustable, a roll journaled immediately in advance of said bale shaft, an adjustable and spring-held guide encircling said roll, a main roll journaled in said frame, a tension roll journaled between said main roll and said guide roll, a plurality of knives adjustable and supported over said main roll and arranged to extend into the material passing thereover, a plurality of spring-held pressure rollers engaging said material in advance of said knives, and a shaft journaled to the rear of said main roller and receiving the material in bale form.

9. In a device of the class described, in combination, a shaft carrying the bale of material and laterally adjustable, a roll journaled adjacent to said bale shaft, a guide plate encircling said roll, a bar extending under said roll and having a longitudinal slot therein and connected to said guide plate in said slot, a spring exerting a constant pull on said bar and consequently on said guide plate against the edge of the material passing over said roll, a main roll suitably driven, a tension roll between said main roll and said guide roll, a knife adjustably secured above the said main roll and extending through the material passing thereover, and rollers spring-held to said material on said main roll in advance of the cutting operation.

Signed at the city and district of Montreal, in the Province of Quebec, in the Dominion of Canada, this 30th day of May, 1908.

FRANK WINDSOR DENISON.

Witnesses:
H. DAVES,
G. H. TRESIDDER.